3,395,179
N,N-DIFLUOROUREA AND PROCESS FOR PREPARING

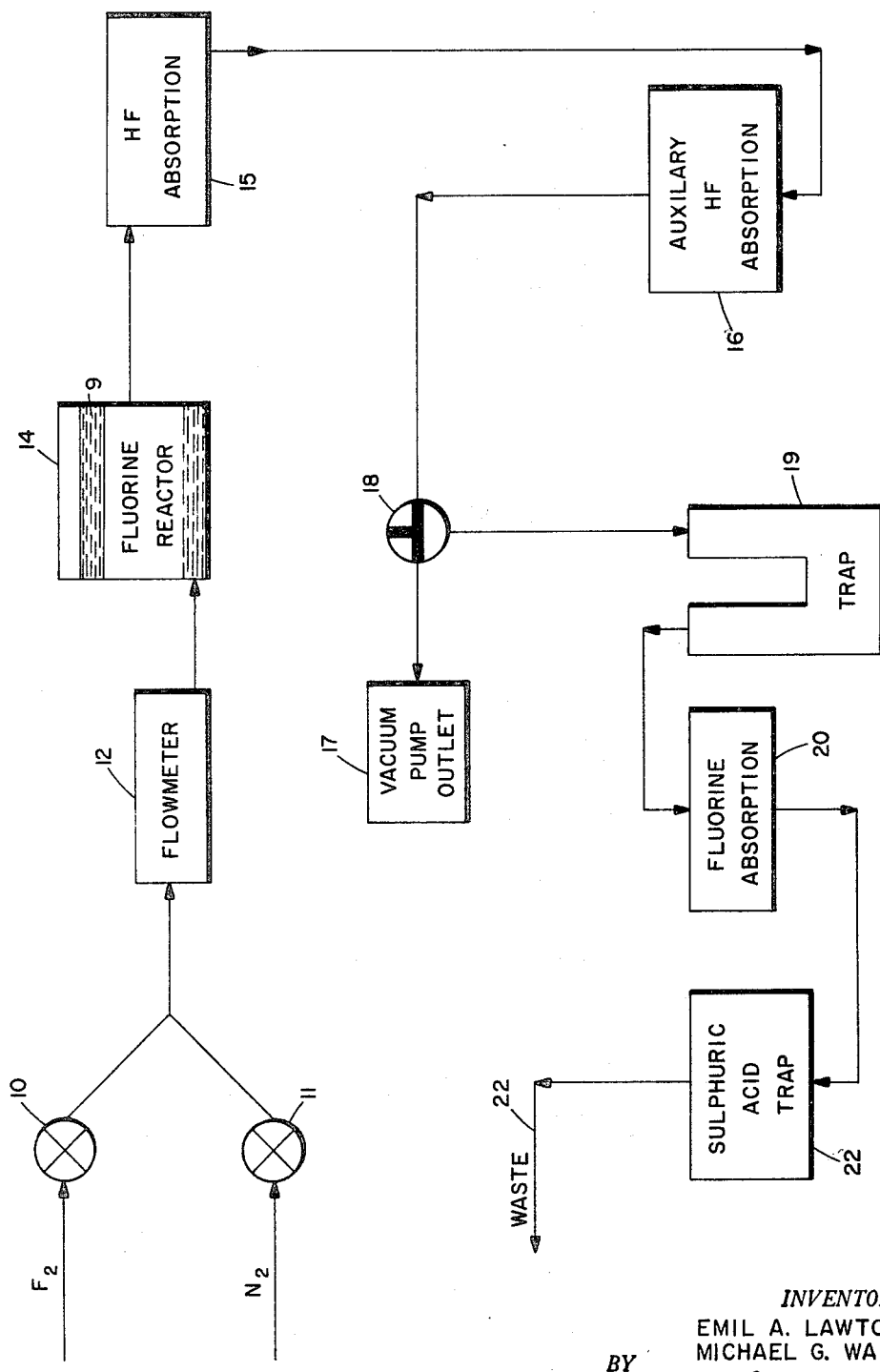

Emil A. Lawton and Michael G. Warner, Woodland Hills, Calif., assignors to North American Rockwell Corporation, a corporation of Delaware
Continuation-in-part of application Ser. No. 840,066, Sept. 15, 1959. This application Apr. 17, 1961, Ser. No. 103,512
2 Claims. (Cl. 260—543)

This application is a continuation-in-part of copending application Ser. No. 840,066, filed Sept. 15, 1959, now U.S. Patent 3,294,495. This invention relates to a novel class of organic compounds having utility in the chemical arts. More particularly, this invention is concerned with fluorinated urea compounds in which two atoms of fluorine are bonded into a single nitrogen atom.

It has been discovered that a new class of fluorine and nitrogen-containing organic compounds are powerful oxidizing agents and monopropellants, as well as intermediates in the preparation of other fluorinated nitrogen compounds.

It is, therefore, an object of this invention to provide a new class of organic compounds. A further object is to provide a class of carbon, hydrogen, nitrogen, and fluorine-containing compounds which are useful as oxidizing agents, monopropellants, and chemical intermediates. Another object of this invention is the provision of a process for preparing oxygenated organic compounds in which fluorine is bonded directly to nitrogen. Further objects of this invention will be apparent from the following description taken in conjunction with the accompanying drawing, in which the figure is a flow diagram of a process of making a N,N-difluorourea.

The objects of this invention are accomplished by N,N-difluorourea which is prepared by a process which comprises reacting a urea having two hydrogen atoms bonded to a single nitrogen atom with a gaseous fluorine source at temperature from —65° C. to about 65° C., or higher. The product is obtained either by evaporating the reaction mixture to dryness and subliming, or by distillation at reduced pressure combined with condensing the product in a cold trap. In particular, N,N-difluorourea is prepared by reacting urea with a gaseous fluorine and subsequently either evaporating the mixture to dryness and subliming the residue or direct subliming the product from the reaction mixture and collecting the product in a cold trap cooled to under —50° C.

The figure is a flow diagram of a method of making a fluorinated urea and shows the entry of fluorine gas and nitrogen gas which are metered by valves 10 and 11 into a glass or Pyrex flowmeter 12 which measures the rate of flow of the gases into a reactor 14. The urea to be fluorinated is placed on a grid 9 in a reactor 14, which is preferably of stainless steel, and arranged so that any liquid formed drops below the grid and collects in the bottom of the reactor adjacent to the gas inlet tube. Prior to the commencement of actual fluorination, the system shown in the figure is flushed with nitrogen and cooling baths are employed where necessary. The reactor 14 may be cooled with low temperature water. Measured flows of fluorine and nitrogen are passed into the reactor 14, forming the reactor liquid containing the product, and the exit gas passed into hydrogen fluoride absorbers 15 and 16 which may contain sodium fluoride as the absorbing agent. The gases then pass sequentially through a cooled U-trap 19 in which gaseous by-products are condensed, a fluorine absorber 20, containing potassium or sodium chloride, and, optionally, a sulfuric acid trap 21. Residual gases from the trap 21 are passed to waste through line 22. The trap 19 is detachable from the overall system. Three-way valve 18 is suitably positioned when removing trap 19 from the system so that vacuum pump outlet 17 may remove gases being formed in reactor 14.

The temperature in the reactor may range from approximately —65° C. to about +65° C., for satisfactory results. Preferred temperatures are —30° C. to +30° C. It has been found that the preferred temperature within the reactor 14 is approximately 0° C. The pressure in the reactor 14 is generally atmospehric, although higher and lower pressures may be employed. A pressure range of from about one-half atmosphere to 2 atmospheres is preferable in the reactor. The particular time of fluorination is dependent upon the size of the sample, the gas flow rate and the particular particle size and shape of the starting material, but ranges in general from a few minutes to 20 hours or more. A preferred reaction time ranges from about 2 to 15 hours for maximum utilization of equipment and good yield of product.

The ratio of the mols of fluorine to mols of urea is in the range of from about 0.5:1 to about 3.0:1. About 0.8 mol of $F_2$ per mol of urea is a preferred ratio. However, when employing higher molecular weight N-substituted ureas, larger amounts of $F_2$ may be employed to compensate for side chain fluorination and cleavage which may occur. The ratio of mols of $F_2$ to mols of inert dilent flowing through flowmeter 12 is in a preferred range of from 1:10 to 2:1. The ratio of diluent to $F_2$ may encompass a ratio of diluent to $F_2$, on the mol basis of from about 1:10 to 15:1. The rate of reaction of the fluorine and urea is practically instantaneous. Due to the reaction being exothermic, fluorine is passed into the reactor slowly.

Although it is preferred to use urea in substantially pure form when conducting the process of this invention, it may be charged into the reactor in the presence of a solvent or diluent which is inert to the reactant. Among suitable diluents are calcium fluoride, other alkali metal and alkaline earth fluorides, and other inorganic solids. In addition, liquid diluents which are inert to fluorine may be employed. These include completely halogenated hydrocarbons such as carbon tetrachloride.

The practice of the present invention is more fully illustrated by the following examples in which all parts and percents are parts by weight unless otherwise designated.

Example 1

In an apparatus essentially as shown in the figure is placed 900 parts of urea on the grid 9 in reactor 14. Prior to charging the urea to the reaction vessel, it is dried for about two days at 105° C. The H-F absorbers 15 and 16 are charged with sodium fluoride, previously dried at 300° C. and suspended on alternate layers of Pyrex wool to permit the free flow of gas. After flushing the apparatus with nitrogen gas and cooling the reactor to approximately 0° C. fluorine gas diluted with nitrogen enters the flowmeter 12 through valves 10 and 11, and passes into the reactor 14. A total of 107 parts of $F_2$ are admitted to the reactor over a six-hour period, along with nitrogen as a diluent. The ratio of $F_2$ to nitrogen is held at 1:2.4.

The trap 19 is cooled to —80° C. and during the fluorination a solid crystalline material collects in the warm side of the trap after passing through the auxiliary hydrogen fluoride absorber 16. This crystalline material is collected and resublimed to give N,N-difluorourea having a melting point in the range of 41.0 to 41.5° C. Additional quantities of N,N-difluoururea are recovered from the reaction mixture by sublimation. The preferred procedure for obtaining N,N-difluorourea from the reaction mixture is to first evaporate the mixture to dryness, collect whatever impure N,N-difluorourea volatilizes and condenses in the cold trap, and then subliming the dried reaction mixture to collect essentially pure N,N-difluorourea.

The infrared spectra of $F_2NCONH_2$ were determined in dichloromethane solution using dichloromethane as a reference, and on a solid mineral oil mull. The structure was proved as follows:

(1) Medium intensity absorptions in dilute solution at 3520 cm.$^{-1}$ and 3420 cm.$^{-1}$ correspond to the N-H stretch of a primary amide. In the solid, these absorptions are shifted to lower frequencies, 3425 and 3320 cm.$^{-1}$, respectively, which is expected for association of a primary amide.

(2) In dilute solution, a strong band is found at 1803 cm.$^{-1}$ corresponding to a carbonyl absorption with a strong electro-negative group in the position. In the solid state, this absorption shifts to a lower frequency, 1790 cm.$^{-1}$. The direction of the shift is as expected for such a structure.

(3) In dilute solution, a strong band at 1592 cm.$^{-1}$ corresponds to the amide II absorption of a primary amide. In the solid state, this absorption is shifted to a higher frequency, 1613 cm.$^{-1}$; the direction of the shift is as expected.

(4) The frequency shifts of the 1803 cm.$^{-1}$ and 1592 cm.$^{-1}$ absorptions which occur on comparison of the spectrum of a dilute solution of the compound with its spectrum in the solid state confirms the assignments of the amide I and amide III bands of a primary amide, respectively, to these absorptions.

(5) There is a large frequency shift of the amide I band from a nominal 1690 cm.$^{-1}$ in dilute solution to 1803 cm.$^{-1}$. A strong absorption at 925 cm.$^{-1}$ has been assigned to the N-F stretch and is compatible with the remainder of the spectrum.

The N,N-difluorourea was also subjected to chemical analysis and found to contain 38.6% fluorine, 29.3% nitrogen, and 14.6% amino nitrogen ($NH_2$). The calculated analysis for N,N-difluorourea is 39.6% fluorine, 29.2% nitrogen, with 14.6% amino nitrogen.

These data unambiguously identify the compound as unsymmetrical difluorourea, $F_2NCONH_2$.

N,N-difluorourea decomposes exothermically upon being heated, but may be stored in polyethylene containers. The compound is soluble in water, dichloromethane, tetrahydrofuran, and other solvents but is insoluble in ethers. As indicated above, it is a crystalline solid having a melting point range of from 41.0 to 41.5° C.

Example 2

The N,N-difluorourea of this invention is useful in the preparation of difluoramine. To illustrate this utility, about 200 parts of crude difluorourea, prepared as in Example 1, are dissolved in 6000 parts of $CH_2Cl_2$. The solution is charged to a heating vessel fitted with a water-cooled condenser and a $-142°$ C. U-trap in series. The system is then flushed with dry nitrogen gas and heated in reflux. The unsymmetrical difluorourea decomposes upon heating. Gaseous products which pass through the water condenser are collected as liquids in the cold trap at $-142°$ C. These condensed gases are fractionated through $-95°$ C. and $-126°$ C. fractions. $HNF_2$ is isolated in the product in good yield and identified by its I.R. spectra.

In conducting the reaction between a urea and fluorine, it is often desirable to flow the fluorine into contact with the urea in conjunction with a gaseous diluent. Furthermore, it is desirable prior to the reaction to purge the system with an inert gas. Although nitrogen is the preferred inert gas and diluent, argon and the other rare gases, as well as $CO_2$ may be employed.

The N,N-difluorourea of the present invention, in addition to being an intermediate in the preparation of difluoramine, is in its own right a monopropellant and oxidizing agent. When employed as a monopropellant, the compound has an advantage of decomposing stoichiometrically to form completely gaseous products. This is illustrated by the following reaction:

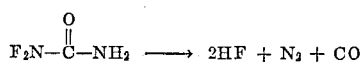

Thus, it is seen that upon decomposing, each mol of N,N-difluorourea produces four mols of completely gaseous product. Decomposition of the compound occurs at under 120° C. and the specific impulse attainable is over 200 seconds. Specific impulse is the parameter which describes the efficiency of a rocket propellant and is defined as the pounds of thrust produced per pound of propellant consumed per second.

Although the invention has been described and illustrated in detail, it is to be clearly understood that the same is by way of illustration and example only and is not to be taken by way of limitation, the spirit and scope of this invention being limited only by the terms of the appended claims.

We claim:
1. N,N-difluorourea.
2. The method of preparing N,N-difluorourea, which comprises reacting fluorine and urea.

References Cited
UNITED STATES PATENTS 2,855,435  10/1958  Grillot et al. _____ 260—554
2,971,959  2/1961   Waugh et al. _____ 260—555

HENRY R. JILES, *Primary Examiner.*